(12) United States Patent
Röstin et al.

(10) Patent No.: US 7,979,707 B2
(45) Date of Patent: Jul. 12, 2011

(54) SECURE SEED GENERATION PROTOCOL

(75) Inventors: Peter Röstin, Belmont, CA (US); Magnus Nyström, Vallentuna (SE); William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1595 days.

(21) Appl. No.: 10/549,542

(22) PCT Filed: Jul. 9, 2004

(86) PCT No.: PCT/US2004/021846
§ 371 (c)(1),
(2), (4) Date: Sep. 15, 2005

(87) PCT Pub. No.: WO2005/008950
PCT Pub. Date: Jan. 27, 2005

(65) Prior Publication Data
US 2006/0177056 A1    Aug. 10, 2006

Related U.S. Application Data

(60) Provisional application No. 60/486,127, filed on Jul. 10, 2003.

(51) Int. Cl.
*H04L 9/32* (2006.01)
*H04L 9/12* (2006.01)

(52) U.S. Cl. ......... 713/171; 380/260; 380/284; 380/285

(58) Field of Classification Search .................. 380/37, 380/42, 44–47, 259–260, 262–263, 281, 380/283–285, 278, 273; 726/14; 713/171, 713/168, 169
See application file for complete search history.

(56) References Cited

U.S. PATENT DOCUMENTS

| | | | |
|---|---|---|---|
| 4,200,770 A | | 4/1980 | Hellman et al. |
| 5,657,390 A | | 8/1997 | Elgamal et al. |
| 5,784,463 A | * | 7/1998 | Chen et al. ................. 713/171 |
| 5,963,646 A | | 10/1999 | Fielder et al. |
| 6,052,784 A | * | 4/2000 | Day .............................. 726/22 |
| 6,125,186 A | | 9/2000 | Saito et al. |
| 6,148,404 A | | 11/2000 | Yatsukawa |
| 6,189,098 B1 | | 2/2001 | Kaliski, Jr. |
| 7,298,851 B1 | * | 11/2007 | Hendricks et al. ............ 380/282 |

(Continued)

OTHER PUBLICATIONS

Microsoft Corporation, Microsoft Computer Dictionary, May 1, 2002, Microsoft Press, Fifth Edition.*

(Continued)

*Primary Examiner* — Gilberto Barron, Jr.
*Assistant Examiner* — Virginia Ho
(74) *Attorney, Agent, or Firm* — Ryan, Mason & Lewis, LLP

(57) ABSTRACT

Techniques for secure generation of a seed for use in performing one or more cryptographic operations, utilizing a seed generation protocol carried out by a seed generation client (110c) and a seed generation server (110s). The seed generation server (110s) provides a first string to the seed generation client (110c). The seed generation client (110c) generates a second string, encrypts the second string utilizing a key (216), and sends the encrypted second string to the seed generation server (110s). The seed generation client (110c) generates the seed as a function of at least the first string and the second string. The seed generation server (110s) decrypts the encrypted second string (222) and independently generates the seed as a function of at least the first string and the second string.

40 Claims, 3 Drawing Sheets

U.S. PATENT DOCUMENTS

| | | | | |
|---|---|---|---|---|
| 7,366,306 | B1 * | 4/2008 | Trimberger | 380/278 |
| 7,373,507 | B2 * | 5/2008 | Simms | 713/168 |
| 2001/0055388 | A1 * | 12/2001 | Kaliski, Jr. | 380/30 |
| 2002/0013794 | A1 * | 1/2002 | Carro et al. | 707/534 |
| 2002/0062451 | A1 * | 5/2002 | Scheidt et al. | 713/201 |
| 2002/0164026 | A1 * | 11/2002 | Huima | 380/247 |

OTHER PUBLICATIONS

Burnett, S. and Paine, S., RSA Security's Official Guide to Cryptography, 2001, McGraw-Hill Professional.*

Menezes, A. J., van Oorschot, P. C., Vanstone, S. A., Handbook of Applied Cryptography, 1997, CRC Press LLC.*

Schmeh, K. S., Cryptography and Public Key Infrastructure on the Internet, Jun. 16, 2003, John Wiley & Sons Ltd.*

V. Boyko, P. MacKenzie, and S. Patel. Provably Secure Password-Authenticated Key Exchange Using Diffie-Hellman. Lecture Notes in Computer Science, 2000. Springer.*

Menezes et al. ("Handbook of Applied Cryptography. Chapter 12. Key Establishment Protocols", 1997).*

* cited by examiner

SECURE SEED GENERATION PROTOCOL

RELATED APPLICATION(S)

The present application claims the priority of U.S. Provisional Patent Application Ser. No. 60/486,127, filed Jul. 10, 2003 and entitled "Secure Seed Generation Protocol (SSGP)," the disclosure of which is incorporated by reference herein.

FIELD OF THE INVENTION

The present invention relates generally to the field of cryptography, and more particularly to techniques for generating a shared secret or other type of seed for use in cryptographic operations.

BACKGROUND OF THE INVENTION

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SECURID® authentication token commercially available from RSA Security Inc. of Bedford, Mass., U.S.A. The RSA SECURID® authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA ACE/SERVER® software, available from RSA Security Inc. The PIN and current token code may be transmitted to the authentication entity via an encryption agent equipped with RSA ACE/AGENT® software, also available from RSA Security Inc. If the PIN and current token code are determined to be valid, the user is granted access appropriate to his or her authorization level. Thus, the token codes are like temporary passwords that cannot be guessed by an attacker, with other than a negligible probability.

A given RSA SECURID® token typically contains one or more seeds that are utilized in computing the token outputs. The authentication entity performing the verification of the token outputs requires access to one or more seeds associated with the token in question. Typically, such authentication entities have access to the same seed or set of seeds that the token uses to generate its output.

In certain situations it is desirable for the token and authentication entity to be configured to generate a seed for their joint use. Conventional seed generation techniques can be problematic in that use of such techniques may result in the seed becoming accessible in plaintext form to entities other than the token and the authentication entity. This problem may be addressed by requiring the token and the authentication entity to be pre-configured with certain trusted keys. However, such an approach is inefficient and may introduce additional security concerns.

Accordingly, a need exists for improved techniques for secure seed generation in authentication tokens and other applications.

SUMMARY OF THE INVENTION

The present invention provides methods and apparatus for secure seed generation which in an illustrative embodiment overcome one or more of the above-noted drawbacks of conventional techniques.

In accordance with one aspect of the invention, a secure seed generation protocol (SSGP) is carried out between a seed generation client and a seed generation server. The seed generation server provides a first string to the seed generation client. The seed generation client generates a second string, encrypts the second string utilizing a key, and sends the encrypted second string to the seed generation server. The seed generation client generates the seed as a function of at least the first string and the second string. The seed generation server decrypts the encrypted second string and independently generates the seed as a function of at least the first string and the second string.

The key utilized by the seed generation client to encrypt the second string may be, for example, a public key of the seed generation server, or a secret key shared by the seed generation client and the seed generation server.

In accordance with another aspect of the invention, the seed generation client may store the generated seed in an associated authentication token, and the seed generation server may store the generated seed in an associated authentication entity. For example, the generated seed may be used to replace a previously existing seed known to both the seed generation client and the seed generation server. As a more particular example, the authentication token may replace the existing seed with the generated seed after the receipt of a signal from the authentication entity, where the signal from the authentication entity may comprise a message authentication code (MAC) or other authentication code cryptographically derived from the seed. Similarly, the authentication entity may replace the existing seed with the generated seed after receipt of a signal from the authentication token, where the signal from the authentication token may comprise a MAC or other authentication code cryptographically derived from the seed.

The protocol in an illustrative embodiment advantageously provides a high level of assurance for both the seed generation client and the seed generation server that the seed has been correctly generated and not exposed to other entities.

These and other features and advantages of the present invention will become more readily apparent from the accompanying drawings and the following detailed description.

DETAILED DESCRIPTION

The present invention will be described herein with reference to an example network-based communication system in which a processing device communicates over a network with one or more other processing devices. It is to be appreciated, however, that the invention is not restricted to use in this or any other particular system configuration.

Figure 1:
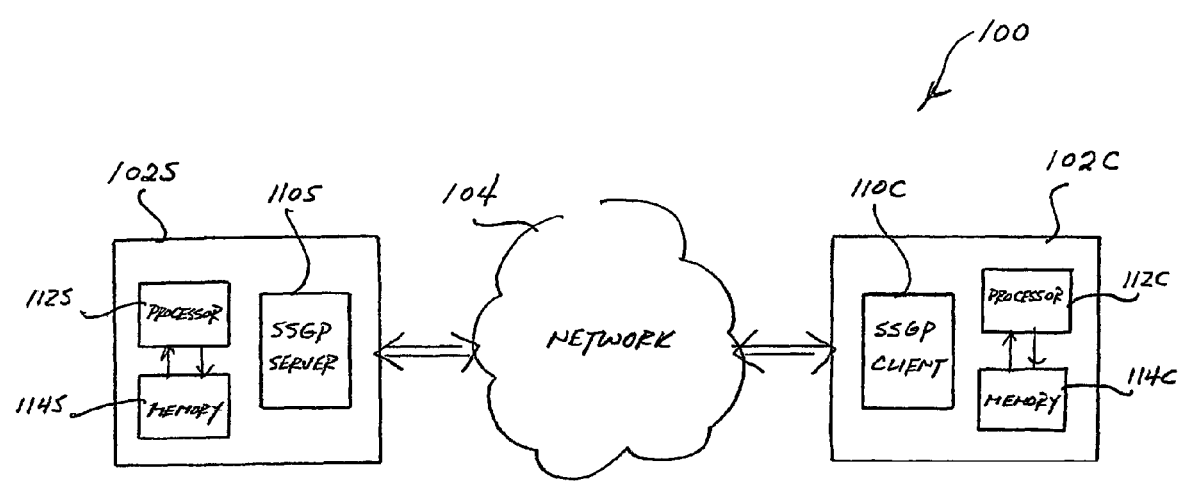
FIG. 1 is a simplified block diagram of an example network-based communication system in which a secure seed generation technique of the present invention is implemented.

FIG. 1 shows a simplified network-based communication system 100 which will be used to illustrate the secure seed generation techniques of the invention. The system 100 includes a pair of processing devices 102 configured to communicate with one another over a network 104. A particular one of the processing devices 102 is denoted for purposes of illustration as a server-side processing device 102S. Similarly, the other processing device 102 is denoted as a client-side processing device 102C. The particular number of devices shown is by way of example only, and a given system in which the invention is implemented may include more or fewer than the particular number of processing devices shown.

The network 104 may represent a global computer network such as the Internet, a wide area network (WAN), a local area network (LAN), a satellite network, a telephone or cable network, or various portions or combinations of these and other types of networks.

In accordance with one aspect of the invention, the processing devices 102S and 102C are configured to implement a secure seed generation protocol (SSGP), for the purpose of generating at least one seed to be utilized by both devices. More particular examples of illustrative implementations of the protocol will be described below in conjunction with FIGS. 2 and 3.

The server-side processing device 102S comprises an SSGP server 110S, and the client-side processing device 102C comprises an SSGP client 110C. Processing devices 102S and 102C further comprise respective processor and memory components 112S, 114S and 112C, 114C, as indicated in the figure. The SSGP server 110S, although shown in the figure as being separate from the processor 112S and memory 114S, may be implemented at least in part in the form of one or more software programs that are stored in memory 114S and executed by processor 112S. Similarly, the SSGP client 110C, although shown in the figure as being separate from the processor 112C and memory 114C, may be implemented at least in part in the form of one or more software programs that are stored in memory 114C and executed by processor 112C. The SSGP server 110S and SSGP client 110P may be viewed as examples of elements more generally referred to herein as a seed generation server and a seed generation client, respectively.

The term "processing device" as used herein refers generally to any processor-based device capable of implementing at least a portion of a secure seed generation technique as described herein.

A given one of the processing devices 102 may represent, by way of example and without limitation, a computer, a mobile telephone, a personal digital assistant (PDA), a smart card, an authentication token, a server, as well as various portions or combinations of these and other processing devices. The processing devices 102 may thus be implemented as otherwise conventional processing devices programmed to perform portions of a seed generation technique as described herein. Conventional aspects of such devices are well known to those skilled in the art, and are therefore not described in detail herein.

In an illustrative embodiment, the processing device 102S comprises or is otherwise associated with an authentication entity, such as a server or other processing device equipped with ACE/SERVER® software, and the processing device 102C comprises or is otherwise associated with an authentication token, such as an RSA SECURID® authentication token. Although this embodiment is presented in the context of an authentication token, the described techniques are adaptable in a straightforward manner to a wide variety of other cryptographic processing devices.

The SSGP server 110S and SSGP client 110C may communicate directly with one another over the network 104, or may communicate via one or more intermediary processing devices. For example, if the processing device 102C comprises an authentication token, it may communicate with processing device 102S over network 104 using an intermediary device such a desktop or portable personal computer, mobile telephone or PDA. Such intermediary devices are not specifically shown in FIG. 1, but processing device 102C may be viewed as comprising, for example, a combination of an authentication token and an associated computer or other intermediary device. Similarly, processing device 102S may incorporate or communicate through one or more intermediary processing devices. As indicated above, the term "processing device" as used herein is intended to encompass such combinations of devices.

In operation, a seed may be generated by SSGP server 110S and SSGP client 110C in the system 100 in the following manner. The SSGP server 110S provides a first string to SSGP client 110C. The SSGP client 110C generates a second string, encrypts the second string utilizing a key, and sends the encrypted second string to the SSGP server. The SSGP client generates the seed as a function of at least the first string and the second string. The SSGP server decrypts the encrypted second string and independently generates the seed as a function of at least the first string and the second string. The key utilized by the SSGP client to encrypt the second string may be, for example, a public key of the SSGP server, or a secret key shared by the SSGP client and SSGP server.

The SSGP client may store the generated seed in an associated authentication token, and the SSGP server may store the generated seed in an associated authentication entity. For example, the generated seed may be used to replace a previously existing seed known to both the SSGP client and the SSGP server. As a more particular example, the authentication token may replace the existing seed with the generated seed after the receipt of a signal from the authentication entity, where the signal from the authentication entity may comprise an authentication code cryptographically derived from the seed. Similarly, the authentication entity may replace the existing seed with the generated seed after receipt of a signal from the authentication token, where the signal from the authentication token may comprise an authentication code cryptographically derived from the seed.

As will be described in greater detail below, such a protocol advantageously provides a high level of assurance for both the SSGP server 110S and the SSGP client 110C that the seed has been correctly generated and not exposed to other entities.

The SSGP protocol may be initiated, for example, by the SSGP server responsive to receipt of a management command from another entity of the system 100, by the SSGP server responsive to receipt of a request initiated by the SSGP client, or by any other suitable initiation mechanism.

Figure 2:
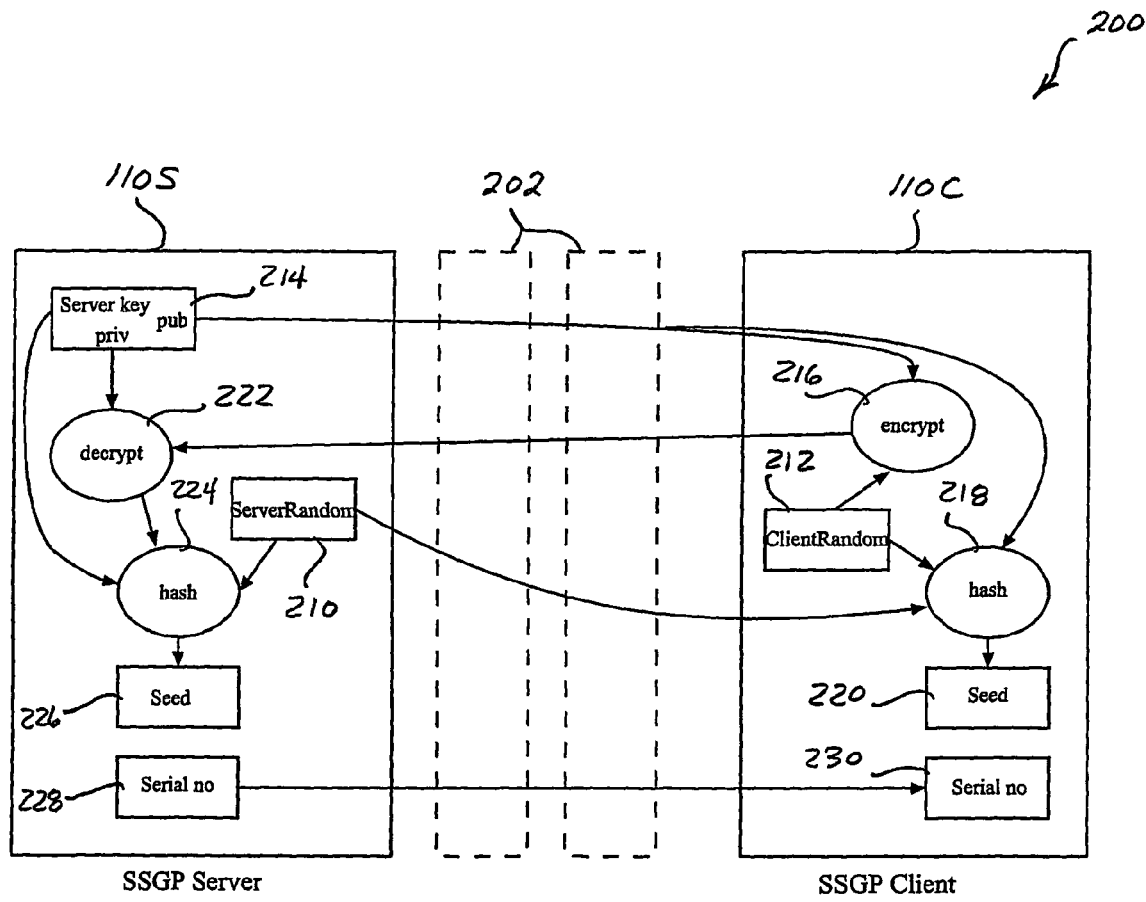
FIGS. 2 and 3 are diagrams showing processing operations associated with secure seed generation in illustrative embodiments of the invention.

FIG. 2 illustrates exemplary processing steps associated with an illustrative embodiment of the SSGP protocol as implemented in a portion 200 of the system 100 of FIG. 1. In this embodiment, SSGP server 110S communicates with SSGP client 110C via one or more intermediary devices 202. As indicated above, the intermediary devices may be part of the same processing devices that implement one or both of the SSGP server and SSGP client, or separate processing devices.

A user wishing to generate and store a seed for his or her authentication token connects to the SSGP server 110S using a desktop computer, mobile telephone, PDA or other processing device configured to implement or communicate with SSGP client 110C. The user provides suitable identifying information, after which the SSGP protocol is initiated. The SSGP client may provide information to the SSGP server about supported SSGP versions, one-time password (OTP) algorithms, and key-wrapping algorithms. Based on this information, the SSGP server provides a random number 210 to the SSGP client, along with information about a particular OTP algorithm to use, characteristics of the seed that is to be generated, and its own public key from key pair 214. As noted previously, a shared key may be used in place of the public key of the SSGP server.

The SSGP client generates a random number 212 and encrypts it in operation 216 with the public key supplied by the SSGP server. The SSGP client then sends the encrypted random number to the SSGP server. The SSGP client also calculates a seed 220 by applying a hash function 218 to a combination of the two random numbers 210 and 212 and the public key of the SSGP server. Again, a shared key may be used in place of the public key of the SSGP server.

The SSGP server decrypts the encrypted random number 212 in operation 222, and generates a seed 226 by applying a hash function 224 to a combination of the two random numbers 210 and 212 and its public key. The SSGP server sends the generated seed 226 and an associated serial number 228 to an authentication entity together with user identifying information. Upon receipt of indication of successful acknowledgment from the authentication entity, the SSGP server sends a corresponding acknowledgment to the SSGP client, along with the serial number. Upon receipt of the acknowledgment from the SSGP server, the SSGP client ensures that the authentication token associates the received serial number 230 with the generated seed 220.

Typically, if the authentication token has already been initialized, a re-initialization may occur only if the SSGP server proves knowledge of the existing seed. This is to protect against unauthorized overwriting of seeds.

The SSGP server 110S may therefore make use of the previously existing seed, known to the authentication entity and known to the token, for the purpose of authenticating and/or synchronizing the SSGP server and SSGP client. For example, the SSGP server may send the previously existing seed, or a suitable derivative thereof, such as an authentication code computed using the seed, optionally with other information, to the SSGP client. When the seed generation protocol has successfully been executed, both the SSGP client and the SSGP server have a new seed. The new seed can be sent to the authentication entity by the SSGP server and used to replace the previously existing seed, or the new seed can be added to the set of previously existing seeds held by the authentication entity. Similarly, the new seed can be sent to the token by the SSGP client and used to replace the previously existing seed, or the new seed can be added to the set of previously existing seeds held by the token.

It should be understood that the particular processing operations of the protocol implemented in the illustrative embodiment of FIG. 2, and the protocols of other embodiments described herein, are not requirements of the invention.

Although reference is made to random numbers in the FIG. 2 embodiment, it is to be appreciated that the invention can be implemented using pseudorandom numbers or other types of strings of sufficient entropy. A given such string may also be referred to herein as a "nonce."

The generated seed may be generated, for example, based on a combination of a pseudorandom string R_S chosen by the SSGP server, a pseudorandom string R_C chosen by the SSGP client, and the key used to protect R_C when it is sent from the SSGP client to the SSGP server. The key, as indicated previously, may be a public key K_S of the SSGP server, represented as an octet string or in another suitable format, or a shared symmetric key.

The strings R_S and R_C in this example correspond to the random numbers 210 and 212, respectively, referred to in the context of the illustrative embodiment of FIG. 2. Each of these strings should have at least as much entropy as the seed to be generated.

An additional benefit of the server string R_S is that it provides assurance to the server that it has contributed to the seed generation process, thereby preventing any replay attacks.

The string R_C may comprise a combination of at least two component strings, including at least a first component generated in the SSGP client by interaction with the SSGP server and a second component previously stored in the SSGP client. The latter component should be unique for each SSGP client for a given manufacturer.

The seed in this particular example may be generated by repeatedly applying an OTP algorithm or other cryptographic algorithm to successive portions of an additional string generated utilizing the first string R_S, the second string R_C and the key K_S. The additional string generated utilizing the first string, the second string and the key may comprise, for example, a concatenation of the first string, the second string and the key.

The cryptographic algorithm may comprise a one-way cryptographic operation, such as a hash function. Examples of suitable hash functions include SHA-1 and SHA-256. The cryptographic algorithm may alternatively comprise an encryption operation, such as an operation associated with the AES algorithm.

For an algorithm which takes two parameters but which is limited in terms of the length of those parameters, the additional string may be viewed as comprising n portions C[1], C[2], . . . C[n], with the seed being generated by computing:

$$I[1] = \text{Algorithm}(C[1], C[2])$$

$$I[2] = \text{Algorithm}(I[1], C[3])$$

$$I[n-1] = \text{Algorithm}(I[n-2], C[n])$$

$$\text{seed} = I[n-1],$$

where Algorithm (A, B) denotes application of the cryptographic algorithm to portion B of the string concatenation utilizing an algorithm parameter denoted by A.

As a more particular example, in which the cryptographic algorithm comprises a hash algorithm such as SHA-1, let TS=R_S|K_S|R_C, where "|" denotes string concatenation. Divide TS into m-bit chunks (appending '00' bytes if necessary) C[1], C[2], . . . C[n], where m is the length of the hash algorithm output in bits. For SHA-1, m=160. After this, the hash algorithm may be applied as follows, where "|" again denotes string concatenation:

$$I[1] = \text{Hash}(C[1]|C[2])$$

$$I[2] = \text{Hash}(I[1]|C[3])$$

$$I[n-1] = \text{Hash}(I[n-2]|C[n])$$

$$\text{Seed} = I[n-1].$$

Intermediate results, each m bits long, may be copied into a DATA array, with the C chunks being copied into a KEY array.

An example in which the cryptographic algorithm comprises an AES algorithm is as follows. Divide TS into 128-bit chunks (appending '00' bytes if necessary) C'[1], C'[2], . . .

C'[n']. After this, AES (in ECB mode, since it cannot be assumed that tokens will support CBC mode) is applied as follows (AES (a, b) is the result of encrypting "b" with key "a" in AES ECB mode):

$$I'[1]=AES(C'[1], C'[2])$$

$$I'[2]=AES(I'[1], C'[3])$$

$$I'[n'-1]=AES(I'[n'-2], C'[n'])$$

Seed=$I'[n'-1]$.

The foregoing seed generation techniques are presented by way of illustrative example only, and should not be construed as limiting the scope of the invention in any way. Those skilled in the art will appreciate that the invention can be implemented using a wide variety of alternative cryptographic algorithms and processing steps.

As mentioned above, a given random number, pseudorandom number or other string generated by an SSGP client may be encrypted using the public key of the SSGP server or a secret key shared by the SSGP client and the SSGP server. If the public key is an RSA key, appropriate padding may be used, for example, in accordance with the padding scheme described in Public-Key Cryptography Standard (PKCS) #1, "RSA Cryptography Standard," v2.1, published by RSA Laboratories. In the case of a shared secret key, the shared key may be used as an OTP seed with R_C applied as an input to the OTP algorithm. Using the notation from the above examples, this operation in the case of the hash algorithm example may be written as:

Encrypted_nonce=Hash (shared_key|OtherInfo)XOR R_C where "OtherInfo" is optional additional information known both to the SSGP client and the SSGP server, and "XOR" denotes bit-wise addition modulo two. The output of the hash algorithm may need to be truncated to match the size of R_C.

The corresponding operation in the encryption algorithm example is given by:

Encrypted_nonce=AES (shared_key, R_C).

Typically, the user connecting to the SSGP server will need to authenticate in order for the server to later on be able to couple the user to the newly-generated seed in the authentication entity. Conventional authentication techniques, of a type well known to those skilled in the art, may be used for this purpose. Once the seed has been generated, and the user authenticated, the SSGP server may provide a corresponding token record to the authentication entity, and, in a concurrent or subsequent step, inform the authentication entity about the association between user and the token.

A description of protocol data units (PDUs) in an exemplary implementation of the seed generation protocol, in ASN.1 format, is as follows. All PDUs in this particular embodiment should be DER-encoded before being sent.

SSGP Generic Request PDU

```
SSGPRequestPDU ::= SEQUENCE {
    payLoad ClientPayload,
    ... -- For future extensions
}
ClientPayLoad ::= CHOICE {
    client_1_PDU [1] SSGP_Client_1_PDU,
    client_2_PDU [2] SSGP_Client_2_PDU,
    ... -- For future extensions
}
```

This type is a container for possible client requests.

SSGP Generic Response PDU

```
SSGPResponsePDU ::= SEQUENCE {
    status Status,
    payload ServerPayload OPTIONAL,
    mac MAC OPTIONAL,
    ... -- For future extensions
}
Status ::= ENUMERATED {
    success                   (0),
    operationsError           (1),
    protocolError             (2),
    timeLimitExceeded         (3),
    OTPAlgorithmNotSupported  (4),
    other                     (127),
    ... -- For future values
}
ServerPayload ::= CHOICE {
    server_1_PDU [1] SSGP_Server_1_PDU,
    server_2_PDU [2] SSGP_Server_2_PDU,
    ... -- For future extensions
}
MAC ::= OCTET STRING
```

The components of the SSGP_PDU type have the following meaning:

status: The status of the response.

payload: Actual payload. If status is not "success," a payload may not be present.

mac: A MAC on the payload. The MAC is included in certain payloads to authorize the command.

SSGP Client Initial PDU

```
SSGP_Client_1_PDU ::= SEQUENCE {
    version ProtocolVersion,
    supportedOTPAlgorithms SEQUENCE OF OTPAlgorithm,
    supportedWrappingAlgorithms   SEQUENCE   OF
WrapAlgorithm,
    flags SSGPFlags OPTIONAL,
    tokenSerialNumber INTEGER (0..MAX) OPTIONAL,
    ... -- For future extensions
}
ProtocolVersion ::= INTEGER {v1(1)}(v1,...)
OTPAlgorithm ::= OBJECT IDENTIFIER
WrapAlgorithm ::= OBJECT IDENTIFIER
SSGPFlags ::= BIT STRING {initialized(0),...}
```

The components of this type have the following meaning:

version: The highest version of this protocol the client supports. Only version one (v1) is specified.

supportedOTPAlgorithms: A sequence of identifiers indicating the OTP algorithms supported by the client.

supportedWrappingAlgorithms: A sequence of identifiers indicating the key-wrapping algorithms supported by the client.

flags: A bit string conveying client information to the SSGP server. Currently only one flag, "initialized," is defined. When this flag is set, it means the SSGP server will have to MAC its initial response, as a successful run of the protocol will result in the existing seed in the client being overwritten.

tokenSerialNumber: In the case of an initialized token, an identifier for the existing seed (allows the server to find the right shared secret for purposes of MAC generation).

SSGP Server Initial Response PDU

```
SSGP_Server_1_PDU ::= SEQUENCE {
    chosenOTPAlgorithm OTPAlgorithm
    chosenWrappingAlgorithm WrappingAlgorithms
    wrappingKey WrappingKey,
    nonce Nonce,
    ... -- For future extensions
}
WrappingKey ::= CHOICE {
    publicKey RSAPublicKey,
    sharedKey KeyIdentifier,
    ... -- For future extensions
}
-- RSAPublicKey is imported from PKCS #1 v2.1
KeyIdentifier ::= OCTET STRING (SIZE(16))
Nonce ::= OCTET STRING (SIZE(8..16))
```

The components of this type have the following meaning:

chosenOTPAlgorithm: The OTP algorithm the client should use to calculate the seed.

chosenWrappingAlgorithm: The key-wrapping algorithm the client should use to protect R_C.

wrappingkey: Information about the key to use when wrapping R_C. For example, the server public key (in PKCS #1 v2.1 format) or an identifier for a shared secret key.

nonce: The pseudorandom string from the SSGP server.

This PDU may be accompanied by a MAC. As indicated previously, a MAC may be needed if the token already has been initialized. In this case, the SSGP server will have to prove to the SSGP client that the server knows the current seed and therefore is authorized to cause it to be overwritten. The MAC value may be computed as described above by letting the nonce component of the response, the actual value of the wrapping key and the old seed form the string 'TS' (i.e., TS=R_S|K_S| existing seed).

As an example, if the server PDU included an R_S='432365 . . . 'H, and identified a shared key with the hexadecimal value '234 . . . 432'H, and the existing seed value is '312 . . . 213'H, then the string TS will be:

432365 . . . |234 . . . 432|312 . . . 213

Such a string would be 384 bits long, assuming the length of R_S was 16 bytes (128 bits), the length of the shared key 16 bytes (128 bits) and the length of the current seed 16 bytes (128 bits).

SSGP Client Second PDU

```
SSGP_Client_2_PDU ::= SEQUENCE {
    encryptedNonce Nonce,
    ... -- For future extensions
}
```

The components of this type have the following meaning:

encryptedNonce: The client's encrypted nonce. The encryption is made using the agreed key-wrapping algorithm and identified key. A DER-encoding of a value of the "Nonce" ASN.1 type is encrypted.

SSGP Server Second Response PDU

```
SSGP_Server_2_PDU ::= SEQUENCE {
    tokenSerialNumber INTEGER (0..MAX),
    ... -- For future extensions
}
```

The components of this type have the following meaning:

tokenSerialNumber: An identifier for the newly generated seed.

When receiving a response PDU with the status "success," the SSGP client associates the generated seed with the token serial number, by appropriate storage of the corresponding data. After this operation, it will not be possible to re-generate the seed unless knowledge of the current seed is proven.

To avoid a false "Commit" message causing the token to end up in an initialized state for which the server does not know the seed, SSGP_Server_2_PDU messages should always be sent with a MAC. The MAC may be made as described above for SSGP_Server_1_PDU messages, with the exception that the input would comprise the newly generated seed and R_C, i.e., TS will be the concatenation of the newly generated seed, the wrapping key, and R_C:

TS=new seed|K_S|R_C.

The foregoing protocol PDU descriptions should be considered illustrative examples, and alternative PDUs or other message formats can be used in other embodiments.

The PDUs described above can be bound to HTTP/1.1 or numerous other communication protocols, as will be apparent to those skilled in the art.

In an implementation utilizing HTTP, the HTTP client normally will be different from the SSGP client, i.e., the HTTP client will only exist to "proxy" SSGP messages from the SSGP client to the SSGP server. Likewise, on the HTTP server side, the SSGP server may receive SSGP PDUs from the HTTP server.

For such an implementation, persistent connections as defined in HTTP/1.1 may be assumed. SSGP requests are mapped to HTTP POST operations. SSGP responses are mapped to HTTP responses. For all SSGP messages, the Content-Type may be set to "application/x-vnd.rsa.ssgp." The Request-URI may be set to that of the SSGP server.

Errors relating to the connection may be transferred to the HTTP client as HTTP errors. Errors relating to the SSGP protocol will be transparent to the HTTP client as they will be sent to the SSGP client in SSGP PDUs.

Figure 3:
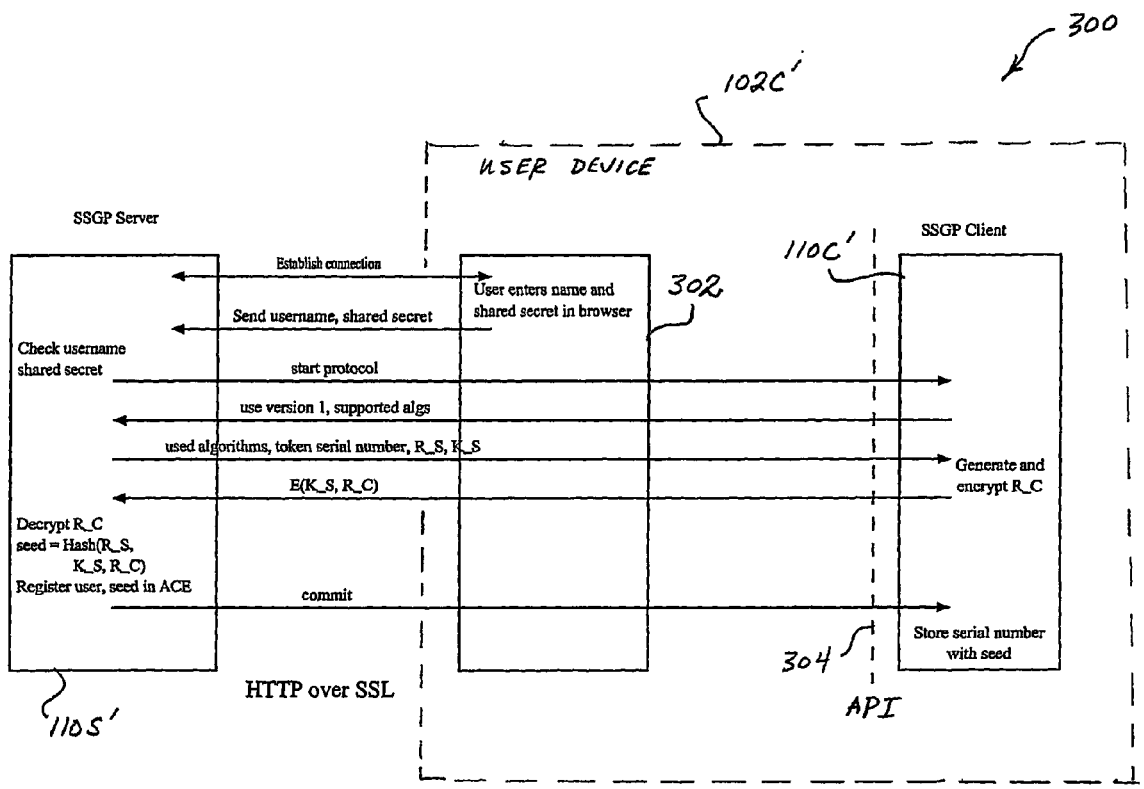

FIG. 3 shows the processing operations associated with secure seed generation in another illustrative embodiment of the invention. In this embodiment, a portion 300 of system 100 comprises a processing device 102C' having a browser portion 302 which may be implemented on a desktop or portable computer, a mobile telephone, a PDA or other device equipped with a conventional browser. The processing device 102C' also implements SSGP client 110C' which communicates via an application programming interface (API) 304 with the browser portion 302 of the processing device 102C'. The browser portion 302 communicates, using HTTP over SSL, with an SSGP server 110S'. The SSGP server 110S' may be implemented on another processing device coupled to the processing device 102C' via network 104.

A secure connection is established between the SSGP server 110S' and the browser portion 302, in a conventional manner, through the SSL protocol. The user name and shared secret are then sent from the browser portion to the SSGP server. The SSGP server checks the user name and shared secret, and if appropriate initiates the SSGP protocol. The SSGP client provides supported algorithm information back to the SSGP server, and the SSGP server responds with used algorithm information, a token serial number, the string R_S and the string K_S. The SSGP client responds by generating R_C, encrypting R_C using K_S, and sending the result back to the SSGP server. In the figure, E(A,B) denotes the encryption of B with key A, K_S denotes the public key of the SSGP server, R_S denotes a random number chosen by the SSGP server, and R_C denotes a random number chosen by SSGP client.

The SSGP server decrypts R_C and generates a seed by applying a hash function to a combination of R_S, K_S and R_C. The SSGP client also generates a seed in a similar manner, although this operation is not explicitly shown in the figure. The SSGP server registers the user and generated seed with an authentication entity, such as a server equipped with RSA ACE/SERVER® software. The SSGP server then sends a commit message to the SSGP client. The SSGP client then stores the serial number with the generated seed.

The initial request PDU from the SSGP client in the FIG. 3 embodiment may be of the following form:

```
POST https://tokens-r-us.com/cgi-bin/ssgp-server HTTP/1.1
Cache-Control: no-cache
Pragma: no-cache
Host: tokens-r-us.com
Content-Type: application/x-vnd.rsa.ssgp
Content-Length: <some value>
binary data (selected version, supported algorithms,...)
```

The initial response PDU from the SSGP server may be as follows:

```
HTTP/1.1 200 OK
Cache-Control: no-cache
Content-Type: application/x-vnd.rsa.ssgp
Content-Length: <some other value>
binary data (random nonce, public key,...)
```

Of course, these particular PDUs, like others provided herein, are presented by way of example only, and numerous alternative message formats may be used.

Advantageously, the secure seed generation techniques disclosed herein overcome one or more of the problems and limitations associated with the above-described conventional techniques. For example, in the illustrative embodiments, the SSGP protocol is configured such that the generated seed is not exposed in plaintext form to any entity other than the SSGP server and the SSGP client, for example, where the server and client comprise an authentication entity and authentication token, respectively. Also, the SSGP protocol does not require any substantial changes to existing infrastructure, such as existing authentication entity and authentication token infrastructure. Furthermore, the SSGP protocol is easy to administer, and scales well to applications involving large numbers of devices.

Details regarding certain conventional cryptographic techniques suitable for use in conjunction with the present invention may be found in, e.g., A. J. Menezes et al., Handbook of Applied Cryptography, CRC Press, 1997, which is incorporated by reference herein.

It should again be emphasized that the particular secure seed generation techniques described above are provided by way of illustration, and should not be construed as limiting the present invention to any specific embodiment or group of embodiments. For example, the invention can be implemented in other types of systems, using different arrangements of processing devices and processing operations. Also, the particular message formats and communication protocols utilized may be varied in alternative embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for secure generation of a seed for use in performing one or more cryptographic operations, the method comprising the steps of:
    a seed generation server providing a first string to a seed generation client;
    the seed generation client generating a second string responsive to receipt of the first string, encrypting the second string utilizing a key, and sending the encrypted second string to the seed generation server;
    the seed generation client generating the seed as a function of at least the first string and the second string; and
    the seed generation server decrypting the encrypted second string and independently generating the seed as a function of at least the first string and the second string;
    wherein the seed generation server sends an authentication code to the seed generation client, the authentication code proving knowledge of the generated seed and instructing the seed generation client to store the generated seed; and
    wherein the authentication code is cryptographically derived from a secret key shared by the seed generation client and the seed generation server.

2. The method of claim 1 wherein the seed comprises a symmetric key.

3. The method of claim 1 wherein the seed is generated, by at least one of the seed generation client and the seed generation server, as a function of the second string, the first string, and identifying information associated with the seed generation server.

4. The method of claim 3 wherein the identifying information associated with the seed generation server comprises a public key of the seed generation server.

5. The method of claim 1 wherein the key utilized by the seed generation client to encrypt the second string comprises a public key of the seed generation server.

6. The method of claim 1 wherein the key utilized by the seed generation client to encrypt the second string comprises the secret key shared by the seed generation client and the seed generation server.

7. The method of claim 1 wherein the seed generation client comprises or is otherwise associated with an authentication token.

8. The method of claim 1 wherein the seed generation server comprises or is otherwise associated with an authentication entity.

9. The method of claim 1 wherein the seed generation server sends the generated seed to an authentication entity.

10. The method of claim 9 wherein the seed generation server also sends user identifying information associated with the seed to the authentication entity.

11. The method of claim 1 wherein the seed generation client is associated with a first processing device and the seed generation server is associated with a second processing device.

12. The method of claim 1 wherein the seed generation client and the seed generation server communicate with one another through at least one intermediary processing device.

13. The method of claim 1 wherein the seed generation server initiates the seed generation process responsive to receipt of a command.

14. The method of claim 1 wherein the seed generation server initiates the seed generation process responsive to receipt of a request initiated by the seed generation client.

15. The method of claim 14 wherein the seed generation client in response to initiation of the seed generation process by the seed generation server provides the seed generation server with information indicating one or more processing algorithms suitable for use in the seed generation process.

16. The method of claim 15 wherein the seed generation server responsive to the information indicating one or more processing algorithms provides to the seed generation client additional information specifying one or more characteristics of the seed generation process.

17. The method of claim 1 wherein the seed generation client stores the generated seed in an authentication token.

18. The method of claim 1 wherein the seed generation server stores the generated seed in an authentication entity.

19. The method of claim 1 wherein the generated seed is used to replace an existing seed known to both the seed generation client and the seed generation server.

20. The method of claim 19 wherein the generated seed is used to replace an existing seed in an authentication token associated with the seed generation client and in an authentication entity associated with the seed generation server.

21. The method of claim 20 wherein the authentication token replaces the existing seed with the generated seed after the receipt of a signal from the authentication entity.

22. The method of claim 21 wherein the signal from the authentication entity comprises the authentication code.

23. The method of claim 20 wherein the authentication entity replaces the existing seed with the generated seed after receipt of a signal from the authentication token.

24. The method of claim 23 wherein the signal from the authentication token comprises the authentication code.

25. A method for secure generation of a seed for use in performing one or more cryptographic operations, the method comprising the steps of:
    a seed generation server providing a first string to a seed generation client;
    the seed generation client generating a second string responsive to receipt of the first string, encrypting the second string utilizing a key, and sending the encrypted second string to the seed generation server;
    the seed generation client generating the seed as a function of at least the first string and the second string; and
    the seed generation server decrypting the encrypted second string and independently generating the seed as a function of at least the first string and the second string;
    wherein the second string comprises a combination of at least two component strings, including at least a first component generated in the seed generation client by interaction with the seed generation server and a second component previously stored in the seed generation client.

26. A method for secure generation of a seed for use in performing one or more cryptographic operations, the method comprising the steps of:
    a seed generation server providing a first string to a seed generation client;
    the seed generation client generating a second string responsive to receipt of the first string, encrypting the second string utilizing a key, and sending the encrypted second string to the seed generation server;
    the seed generation client generating the seed as a function of at least the first string and the second string; and
    the seed generation server decrypting the encrypted second string and independently generating the seed as a function of at least the first string and the second string;
    wherein the seed is generated by repeatedly applying a cryptographic algorithm to successive portions of an additional string generated utilizing the first string, the second string and the key.

27. The method of claim 26 wherein the additional string generated utilizing the first string, the second string and the key comprises a concatenation of the first string, the second string and the key.

28. The method of claim 26 wherein the additional string comprises n portions $C[1], C[2], \ldots C[n]$, and the seed is generated by computing:

$$I[1] = \text{Algorithm}(C[1], C[2])$$

$$I[2] = \text{Algorithm}(I[1], C[3])$$

$$\ldots$$

$$I[n-1] = \text{Algorithm}(I[n-2], C[n])$$

$$\text{seed} = I[n-1],$$

where Algorithm (A, B) denotes application of the cryptographic algorithm to portion B of the string utilizing an algorithm parameter denoted by A.

29. The method of claim 26 wherein the cryptographic algorithm comprises a one-way cryptographic operation.

30. The method of claim 29 wherein the one-way cryptographic operation comprises a hash function.

31. The method of claim 26 wherein the cryptographic algorithm comprises an encryption operation.

32. The method of claim 31 wherein the encryption operation comprises the AES algorithm.

33. An apparatus for secure generation of a seed for use in performing one or more cryptographic operations, the apparatus comprising:
    a processing device comprising a processor coupled to a memory, the processing device implementing at least one of a seed generation client and a seed generation server;
    wherein the seed generation server provides a first string to the seed generation client;
    the seed generation client generates a second string responsive to receipt of the first string, encrypts the second string utilizing a key, and sends the encrypted second string to the seed generation server;
    the seed generation client generates the seed as a function of at least the first string and the second string; and
    the seed generation server decrypts the encrypted second string and independently generates the seed as a function of at least the first string and the second string;
    wherein the seed generation server sends an authentication code to the seed generation client, the authentication code proving knowledge of the generated seed and instructing the seed generation client to store the generated seed; and
    wherein the authentication code is cryptographically derived from a secret key shared by the seed generation client and the seed generation server.

34. A non-transitory machine-readable storage medium containing one or more software programs for secure generation of a seed for use in performing one or more cryptographic operations, wherein the one or more software programs when executed by a processing device implement at least one of a seed generation client and seed generation server;

wherein the seed generation server provides a first string to the seed generation client;

the seed generation client generates a second string responsive to receipt of the first string, encrypts the second string utilizing a key, and sends the encrypted second string to the seed generation server;

the seed generation client generates the seed as a function of at least the first string and the second string; and the seed generation server decrypts the encrypted second string and independently generates the seed as a function of at least the first string and the second string;

wherein the seed generation server sends an authentication code to the seed generation client, the authentication code proving knowledge of the generated seed and instructing the seed generation client to store the generated seed; and wherein the authentication code is cryptographically derived from a secret key shared by the seed generation client and the seed generation server.

35. A method for secure generation of a seed for use in performing one or more cryptographic operations, the method being implemented in a seed generation client, the method comprising the steps of:

receiving a first string from a seed generation server;

generating a second string responsive to receipt of the first string, encrypting the second string utilizing a key, and sending the encrypted second string to the seed generation server; and generating the seed as a function of at least the first string and the second string;

wherein the first string and the second string are configured so as to permit the seed generation server to independently generate the seed as a function of at least the first string and the second string;

wherein the seed generation client receives an authentication code from the seed generation server, the authentication code proving knowledge of the generated seed and instructing the seed generation client to store the generated seed; and wherein the authentication code is cryptographically derived from a secret key shared by the seed generation client and the seed generation server.

36. The method of claim 35, wherein the seed is generated by repeatedly applying a cryptographic algorithm to successive portions of an additional string generated utilizing the first string, the second string and the key.

37. An apparatus for secure generation of a seed for use in performing one or more cryptographic operations, the apparatus comprising:

a processing device comprising a processor coupled to a memory, the processing device implementing a seed generation client;

the seed generation client being configured: (i) to receive a first string from a seed generation server; (ii) to generate a second string responsive to receipt of the first string, to encrypt the second string utilizing a key, and to send the encrypted second string to the seed generation server; and (iii) to generate the seed as a function of at least the first string and the second string;

wherein the first string and the second string are configured so as to permit the seed generation server to independently generate the seed as a function of at least the first string and the second string;

wherein the seed generation client receives an authentication code from the seed generation server, the authentication code proving knowledge of the generated seed and instructing the seed generation client to store the generated seed; and wherein the authentication code is cryptographically derived from a secret key shared by the seed generation client and the seed generation server.

38. A method for secure generation of a seed for use in performing one or more cryptographic operations, the method being implemented in a seed generation server, the method comprising the steps of:

providing a first string to a seed generation client;

receiving from the seed generation client a second string generated responsive to receipt of the first string and encrypted utilizing a key;

decrypting the encrypted second string; and generating the seed as a function of at least the first string and the second string;

wherein the first string and the second string are configured so as to permit the seed generation client to independently generate the seed as a function of at least the first string and the second string;

wherein the seed generation server sends an authentication code to the seed generation client, the authentication code proving knowledge of the generated seed and instructing the seed generation client to store the generated seed; and wherein the authentication code is cryptographically derived from a secret key shared by the seed generation client and the seed generation server.

39. The method of claim 38, wherein the seed is generated by repeatedly applying a cryptographic algorithm to successive portions of an additional string generated utilizing the first string, the second string and the key.

40. An apparatus for secure generation of a seed for use in performing one or more cryptographic operations, the apparatus comprising:

a processing device comprising a processor coupled to a memory, the processing device implementing a seed generation server;

the seed generation server being configured: (i) to provide a first string to a seed generation client; (ii) to receive from the seed generation client a second string generated responsive to receipt of the first string and encrypted utilizing a key; (iii) to decrypt the encrypted second string; and (iv) to generate the seed as a function of at least the first string and the second string;

wherein the first string and the second string are configured so as to permit the seed generation client to independently generate the seed as a function of at least the first string and the second string;

wherein the seed generation server sends an authentication code to the seed generation client, the authentication code proving knowledge of the generated seed and instructing the seed generation client to store the generated seed; and wherein the authentication code is cryptographically derived from a secret key shared by the seed generation client and the seed generation server.

\* \* \* \* \*